United States Patent
Jung et al.

(10) Patent No.: US 9,523,882 B2
(45) Date of Patent: Dec. 20, 2016

(54) FILM FOR BACKLIGHT UNIT AND BACKLIGHT UNIT AND LIQUID CRYSTAL DISPLAY INCLUDING SAME

(71) Applicant: SAMSUNG ELECTRONICS CO., LTD., Suwon-si, Gyeonggi-do (KR)

(72) Inventors: Chul Ho Jung, Gwangju (KR); Hyun A Kang, Suwon-si (KR); Soo Kyung Kwon, Seoul (KR); Won Joo Lee, Pocheon-si (KR); Eun Joo Jang, Suwon-si (KR); Hyo Sook Jang, Suwon-si (KR); Shin Ae Jun, Seongnam-si (KR); Oul Cho, Seongnam-si (KR); In Taek Han, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/741,918

(22) Filed: Jun. 17, 2015

(65) Prior Publication Data

US 2015/0286094 A1 Oct. 8, 2015

Related U.S. Application Data

(62) Division of application No. 13/834,209, filed on Mar. 15, 2013, now Pat. No. 9,158,149.

(30) Foreign Application Priority Data

Apr. 4, 2012 (KR) .......................... 10-2012-0035157

(51) Int. Cl.
*G02F 1/1335* (2006.01)
*F21V 8/00* (2006.01)

(52) U.S. Cl.
CPC ............ *G02F 1/1336* (2013.01); *G02B 6/005* (2013.01); *G02F 1/133615* (2013.01); *G02F 2001/133614* (2013.01); *G02F 2202/32* (2013.01); *Y10T 428/1036* (2015.01); *Y10T 428/24612* (2015.01); *Y10T 428/24802* (2015.01); *Y10T 428/31507* (2015.04); *Y10T 428/31511* (2015.04); *Y10T 428/31551* (2015.04); *Y10T 428/31565* (2015.04); *Y10T 428/31587* (2015.04); *Y10T 428/31663* (2015.04); *Y10T 428/31721* (2015.04); *Y10T 428/31797* (2015.04); *Y10T 428/31862* (2015.04); *Y10T 428/31913* (2015.04); *Y10T 428/31917* (2015.04); *Y10T 428/31938* (2015.04); *Y10T 428/31942* (2015.04)

(58) Field of Classification Search
CPC ........................... G02F 1/133615; G02B 6/005
USPC .......................................... 252/500; 524/496
See application file for complete search history.

(56) References Cited

U.S. PATENT DOCUMENTS

| | | |
|---|---|---|
| 5,593,615 A | 1/1997 | Nerad et al. |
| 5,906,670 A | 5/1999 | Dobson et al. |
| 5,933,346 A | 8/1999 | Brabec et al. |
| 8,436,964 B2 | 5/2013 | Kim et al. |
| 8,445,064 B2 | 5/2013 | Chang et al. |
| 2004/0095658 A1 | 5/2004 | Buretea et al. |
| 2005/0191507 A1 | 9/2005 | Yang et al. |
| 2006/0068154 A1 | 3/2006 | Parce et al. |
| 2007/0034833 A1 | 2/2007 | Parce et al. |
| 2008/0020235 A1 | 1/2008 | Parce et al. |
| 2009/0073349 A1 | 3/2009 | Park et al. |
| 2009/0121190 A1 | 5/2009 | Parce et al. |
| 2009/0212695 A1 | 8/2009 | Kim et al. |
| 2009/0294742 A1 | 12/2009 | Jang et al. |
| 2010/0140551 A1 | 6/2010 | Parce et al. |
| 2010/0176715 A1 | 7/2010 | Bawendi et al. |
| 2010/0208493 A1 | 8/2010 | Choi et al. |
| 2010/0244731 A1 | 9/2010 | Kaihotsu et al. |
| 2010/0314646 A1 | 12/2010 | Breen et al. |

(Continued)

FOREIGN PATENT DOCUMENTS

| | | |
|---|---|---|
| KR | 1020050099289 A | 10/2005 |
| KR | 1020060082011 A | 7/2006 |

(Continued)

OTHER PUBLICATIONS

Korean Decision of Allowance for Patent for Korean Patent Application No. 10-2012-0035157 dated Jul. 31, 2015.

*Primary Examiner* — James J Seidleck
*Assistant Examiner* — Deve E Valdez
(74) *Attorney, Agent, or Firm* — Cantor Colburn LLP

(57) ABSTRACT

A film for a backlight unit including a semiconductor nanocrystal-polymer composite film including a semiconductor nanocrystal and a matrix polymer in which the semiconductor nanocrystal is dispersed, wherein the matrix polymer is a polymer produced by a polymerization of a multifunctional photo-curable oligomer, a mono-functional photo-curable monomer, and a multifunctional photo-curable cross-linking agent, the multifunctional photo-curable oligomer has an acid value of less than or equal to about 0.1 mg of KOH/g, and a content ($A_1$) of a first structural unit derived from the multifunctional photo-curable oligomer, a content ($A_2$) of a second structural unit derived from the mono-functional photo-curable monomer, and a content ($A_3$) of a third structural unit derived from the multifunctional photo-curable cross-linking agent satisfy Equation 1:

$A_1 < (A_2 + A_3)$.   Equation 1

8 Claims, 6 Drawing Sheets

(56) References Cited

U.S. PATENT DOCUMENTS

2011/0180766 A1    7/2011   Jang et al.
2012/0091406 A1    4/2012   Jang et al.
2012/0267616 A1*   10/2012   Jang et al. ...................... 257/40

FOREIGN PATENT DOCUMENTS

| | | |
|---|---|---|
| KR | 1020080100726 A | 11/2008 |
| KR | 1020090028928 A | 3/2009 |
| KR | 1020090038022 A | 4/2009 |
| KR | 1020090064079 A | 6/2009 |
| KR | 1020090078547 A | 7/2009 |
| KR | 1020090091552 A | 8/2009 |
| KR | 1020090124550 A | 12/2009 |
| KR | 1020100028755 A | 3/2010 |
| KR | 1020100029519 A | 3/2010 |
| KR | 1020100094194 A | 8/2010 |
| KR | 1020100129030 A | 12/2010 |
| KR | 1020110005177 A | 1/2011 |
| KR | 1020110006900 A | 1/2011 |
| KR | 1020110045302 A | 5/2011 |
| KR | 1020110072210 A | 6/2011 |
| WO | 9529966 A1 | 11/1995 |

\* cited by examiner

FILM FOR BACKLIGHT UNIT AND BACKLIGHT UNIT AND LIQUID CRYSTAL DISPLAY INCLUDING SAME

CROSS-REFERENCE TO RELATED APPLICATION

This application is a division of U.S. patent application Ser. No. 13/834,209 which claims priority to Korean Patent Application No. 10-2012-0035157, filed on Apr. 4, 2012, and all the benefits accruing therefrom under 35 U.S.C. §119, the contents of which are incorporated herein in their entirety by reference.

BACKGROUND

1. Field

This disclosure relates to a film for a backlight unit, and a backlight unit and liquid crystal display device including the same.

2. Description of the Related Art

Unlike plasma display panels ("PDPs") and field emission displays ("FEDs") which form an image using self-emitting light, liquid crystal display ("LCD") devices form an image by receiving external light. Thus, the LCD devices require a backlight unit for emitting light on the back surface thereof.

A cold cathode fluorescent lamp ("CCFL") has been used as a light source for an LCD device. However, when the CCFL is used as a light source, it may not provide uniform luminance, or the color purity may be deteriorated, as the LCD device has a larger screen.

As a result, a backlight unit which uses three color LEDs as a light source has been recently developed. Since the backlight unit using the three color LEDs as the light source produces improved color purity, as compared to the backlight unit using the CCFL, it may, for example, be used in a high quality display device. However, the backlight unit using three color LEDs as a light source costs more than the backlight unit using the CCFL as a light source. To mitigate this problem, a white LED which emits light by converting light output from a single color LED chip to white light has been proposed.

Although the white LED is not as expensive as the three color LEDs, color purity and color reproducibility are reduced compared to color purity and color reproducibility of an LCD device including the three color LEDs. Thus, there remains a need to develop a light source capable of maintaining price competitiveness as well as improving color purity and color reproducibility.

SUMMARY

An embodiment provides a film for a backlight unit ("BLU") for a liquid crystal display device using a light emitting diode ("LED") as a light source.

Another embodiment provides a backlight unit including the film for a backlight unit.

Yet another embodiment provides a liquid crystal display device including the backlight unit.

According to an embodiment, provided is a film for a backlight unit that includes a semiconductor nanocrystal-polymer composite film including a semiconductor nanocrystal and a matrix polymer in which the semiconductor nanocrystal is dispersed, wherein the matrix polymer includes a polymerization product of a multifunctional photo-curable oligomer, a mono-functional photo-curable monomer, and a multifunctional photo-curable cross-linking agent, the multifunctional photo-curable oligomer has an acid value of less than or equal to about 0.1 milligram of KOH/gram, and a content ($A_1$) of a first structural unit derived from the multifunctional photo-curable oligomer, a content ($A_2$) of a second structural unit derived from the mono-functional photo-curable monomer, and a content ($A_3$) of a third structural unit derived from the multifunctional photo-curable cross-linking agent satisfy the following Equation 1.

$$A_1 < (A_2 + A_3). \quad \text{Equation 1}$$

The ratio $A_1:(A_2+A_3)$ may be from about 10:90 to about 55:45.

The multifunctional photo-curable oligomer may be an oligomer including at least two acrylate functional groups or at least two methacrylate functional groups, and may be selected from urethane (meth)acrylate, epoxy (meth)acrylate, polyester (meth)acrylate, acrylic (meth)acrylate, polybutadiene (meth)acrylate, silicone (meth)acrylate, melamine (meth)acrylate, and a combination thereof.

The multifunctional photo-curable oligomer may have a weight average molecular weight ("Mw") of about 1,000 to about 20,000.

The multifunctional photo-curable oligomer may have an acid value of less than or equal to about 0.01 milligram of KOH/gram.

The mono-functional photo-curable monomer may be a compound represented by the following Chemical Formula 1.

$$R^1—X^1 \quad \text{Chemical Formula 1}$$

In Chemical Formula 1, $R^1$ is a substituted or unsubstituted C6 to C30 linear or branched aliphatic group, a substituted or unsubstituted C5 to C30 alicyclic group, a substituted or unsubstituted C2 to C30 aromatic group, and $X^1$ is an acrylate group, a methacrylate group, an acryloyl group, a methacryloyl group, or a C2 to C10 alkenyl group.

The mono-functional photo-curable monomer may be selected from isobornyl(meth)acrylate, isooctyl(meth)acrylate, lauryl(meth)acrylate, benzoyl(meth)acrylate, norbornyl (meth)acrylate, cyclohexyl(meth)acrylate, n-hexyl(meth) acrylate, adamantyl acrylate, cyclopentyl acrylate, and a combination thereof.

The mono-functional photo-curable monomer may have a solubility parameter of about 8 to about 10 (calories/centimeter$^3$)$^{1/2}$ for a semiconductor nanocrystal.

When a solubility parameter of the mono-functional photo-curable monomer is $\delta_A$, and a solubility parameter of the aromatic hydrocarbon-based solvent or halogenated aliphatic hydrocarbon-based solvent is $\delta_B$, a difference of the solubility parameter ($|\delta_A - \delta_B|$) may be less than or equal to about 5.

The multifunctional photo-curable cross-linking agent may be a compound represented by the following Chemical Formula 2.

$$R^2{\textstyle-\!\!\![}X^2]_b \quad \text{Chemical Formula 2}$$

In Chemical Formula 2, $R^2$ is a substituted or unsubstituted C3 to C30 linear or branched aliphatic group, a substituted or unsubstituted C3 to C30 alicyclic group, or a substituted or unsubstituted C2 to C30 aromatic group, $X^2$ is an acrylate group, or a methacrylate group, and b is greater than or equal to 2, and does not exceed a valence of $R^2$.

The mono-functional photo-curable monomer and the multifunctional photo-curable cross-linking agent may include the same functional group.

The semiconductor nanocrystal may be selected from a Group II-VI compound, a Group III-V compound, a Group IV-VI compound, a Group IV element, a Group IV compound, and a combination thereof.

The semiconductor nanocrystal may have a full width at half maximum ("FWHM") of less than or equal to about 45 nanometers in a light emitting wavelength spectrum.

The semiconductor nanocrystal-polymer composite film may further include an inorganic oxide.

The semiconductor nanocrystal may form a cluster including a plurality of semiconductor nanocrystals, and the cluster may have a particle size of less than or equal to about 2 micrometers.

The semiconductor nanocrystal-polymer composite film may include a first composite including a red semiconductor nanocrystal and a first transparent matrix encapsulating the red semiconductor nanocrystal; a second composite including a green semiconductor nanocrystal and a second transparent matrix encapsulating the green semiconductor nanocrystal; and a matrix polymer in which the first composite and the second composite are dispersed.

The first composite and the second composite may each have particle size of less than or equal to about 2 micrometers.

The semiconductor nanocrystal-polymer composite film may include a composite including a mixture of a red semiconductor nanocrystal and a green semiconductor nanocrystal and a transparent matrix encapsulating the mixture; and a matrix polymer in which the composite is dispersed.

The composite may have a particle size of less than or equal to about 2 micrometers.

The semiconductor nanocrystal-polymer composite film may have a predetermined pattern on at least one surface.

The film for a backlight unit may further include a barrier film disposed on at least one side of the semiconductor nanocrystal-polymer composite film.

The barrier film may include a polymer selected from a polyester, a polycarbonate, a polyolefin, a cyclic olefin polymer ("COP"), a polyimide, a polymerization product of a first monomer including at least two thiol (—SH) groups at a terminal end and a second monomer including at least two carbon-carbon unsaturated bond-containing groups, and a combination thereof.

The barrier film may further include an inorganic oxide.

The barrier film may have a protruded and recessed pattern on at least one side of the semiconductor nanocrystal-polymer composite film.

The semiconductor nanocrystal-polymer composite film may be provided from a photo-curable composition including a semiconductor nanocrystal, a multifunctional photo-curable oligomer, a mono-functional photo-curable monomer, a multifunctional photo-curable cross-linking agent, and a photoinitiator. When a light emitting wavelength of the photo-curable composition is $\lambda_A$ and an intrinsic light emitting wavelength of the semiconductor nanocrystal is $\lambda_B$, a difference $|\lambda_A-\lambda_B|$ may be in the range of less than or equal to about 5 nanometers.

According to another embodiment, a backlight unit including the film for a backlight unit is provided.

The backlight unit includes
an LED light source;
the film for a backlight unit disposed separate from the LED light source to convert light emitted from the LED light source to white light and to provide the converted white light toward liquid crystal panel; and
a light guide panel disposed between the LED light source and the film for a backlight unit.

The backlight unit may further include at least one film selected from a diffusion plate, a prism sheet, a microlens sheet, and a brightness improvement film on the film for a backlight unit.

The film for a backlight unit may be positioned between at least two films selected from a light guide, a diffusion plate, a prism sheet, a microlens sheet, and a brightness improvement film (e.g., double brightness improvement film).

The white light provided from the film for a backlight unit may have Cx ranging from about 0.20 to about 0.50 and Cy ranging from about 0.18 to about 0.42 in a CIE 1931 chromaticity diagram. When the LED light source is a blue LED light source, the green semiconductor nanocrystal and the red semiconductor nanocrystal may be included to provide a ratio of optical density ("OD") (absorbance of first absorption maximum wavelength at UV-Vis absorption spectrum) of about 2:1 to about 7:1.

The film for a backlight unit may include a plurality of layers which are disposed to provide a light emitting wavelength of lower energy going toward the LED light source.

According to yet another embodiment, a liquid crystal display device is provided.

According to still another embodiment, provided is a method of manufacturing a film for a backlight unit that includes:

contacting semiconductor nanocrystals dispersed in a solvent with a mono-functional photo-curable monomer to prepare a mixture;

contacting a multifunctional photo-curable oligomer, a multifunctional photo-curable cross-linking agent, and a photoinitiator with the mixture to prepare a photo-curable composition;

coating the photo-curable composition on a substrate to provide a photo-curable composition coating; and photo-curing the photo-curable composition coating to prepare the film.

Before photo-curing, the photo-curable composition coating may be contacted with a mold with a predetermined pattern, to form a pattern on the coating, then the mold removed prior to photo-curing.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
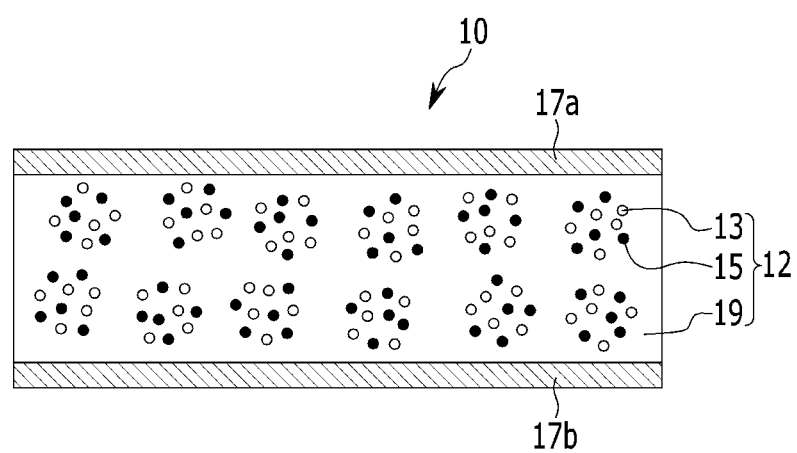
FIG. 1 is a schematic view of a film for a backlight unit according to an embodiment.

This disclosure will be described more fully hereinafter in the following detailed description of this disclosure, in which some but not all embodiments of this disclosure are described. This disclosure may be embodied in many different forms and is not to be construed as limited to the embodiments set forth herein; rather, these embodiments are provided so that this disclosure will fully convey the scope of the invention to those skilled in the art.

In order to clarify embodiments of the present disclosure, parts that do not have relationships are omitted, and the same or similar constituent elements are assigned with the same reference number through this disclosure.

In the drawings, the thickness of layers, films, panels, regions, etc., are exaggerated for clarity. Like reference numerals designate like elements throughout the specification.

Accordingly, the embodiments are merely described below, by referring to the figures, to explain aspects of the present description. As used herein, the term "and/or" includes any and all combinations of at least one of the associated listed items. Expressions such as "at least one," when preceding a list of elements, modify the entire list of elements and do not modify the individual elements of the list.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, when a definition is not otherwise provided, the term "substituted" may refer to a group or compound substituted with a substituent selected from a C1 to C30 alkyl group, a C2 to C30 alkenyl group, a C2 to C30 alkynyl group, a C6 to C30 aryl group, a C7 to C30 alkylaryl group, a C1 to C30 alkoxy, a C6 to C30 aryloxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (—F, —Cl, —Br, or —I), a nitro group (—NO$_2$), a cyano group (—CN), an amino group (NRR', wherein R and R' are independently hydrogen or a C1 to C6 alkyl group), an azido group (—N$_3$), an amidino group (—C(=NH)NH$_2$), a hydrazino group (—NHNH$_2$), a hydrazono group (=N(NH$_2$), an aldehyde group (—C(=O)H), a carbamoyl group (—C(O)NH$_2$), a thiol group (—SH), an ester group (—C(=O)OR, wherein R is a C1 to C6 alkyl group or a C6 to C12 aryl group), and a combination thereof instead of hydrogen, provided that the substituted atom's normal valence is not exceeded.

As used herein, when a definition is not otherwise provided, the prefix "hetero" may refer to a group that includes at least one ring member (e.g., 1 to 4 ring members) that is a heteroatom (e.g., 1 to 4 heteroatoms, each independently selected from N, O, S, Si, or P). The total number of ring members may be 3 to 10. If multiple rings are present, each ring is independently aromatic, saturated, or partially unsaturated, and multiple rings, if present, may be fused, pendant, spirocyclic, or a combination thereof. Heterocycloalkyl groups include at least one non-aromatic ring that contains a heteroatom ring member. Heteroaryl groups include at least one aromatic ring that contains a heteroatom ring member. Non-aromatic and/or carbocyclic rings may also be present in a heteroaryl group, provided that at least one ring is both aromatic and contains a ring member that is a heteroatom.

As used herein, the term "functional" may refer to photo-curable functional group.

As used herein, the term "combination thereof" refers to a mixture, a stacked structure, a composite, an alloy, a blend, a reaction product, or the like.

As used herein, the term "(meth)acrylate" may be acrylate or methacrylate.

As used herein, the term "alkyl" refers to a monovalent group derived from a straight or branched chain saturated aliphatic hydrocarbon, and having a specified number of carbon atoms. Alkyl groups include, for example, groups having from 1 to 30 carbon atoms (C1-C30 alkyl).

As used herein, the term "alkenyl" refers to a monovalent group derived from a straight or branched chain saturated aliphatic hydrocarbon, having at least one double bond, and having a specified number of carbon atoms. Alkenyl groups include, for example, groups having from 2 to 30 carbon atoms (C2-C30 alkenyl).

As used herein, the term "alkynyl" refers to a monovalent group derived from a straight or branched chain saturated aliphatic hydrocarbon, having at least one triple bond, and having a specified number of carbon atoms. Alkynyl groups include, for example, groups having from 2 to 30 carbon atoms (C2-C30 alkynyl).

As used herein, the term "aryl" refers to a monovalent group derived from a cyclic moiety in which all ring members are carbon and at least one ring is aromatic, and having a specified number of carbon atoms. Aryl groups include, for example, groups having from 6 to 30 carbon atoms (C6-C30 aryl).

As used herein, the term "alkylaryl" refers to an alkyl group covalently linked to a substituted and unsubstituted aryl group, and having a specified number of carbon atoms. Alkylaryl groups include, for example, groups having from 7 to 30 carbon atoms (C7-C30 alkylaryl).

As used herein, the term "alkoxy" refers to an alkyl group which is linked via an oxygen, and having a specified number of carbon atoms. Alkoxy groups include, for example, from 1 to 30 carbon atoms (C1-C30 alkoxy groups).

As used herein, the term "aryloxy" refers to an aryl group which is linked via an oxygen, and having a specified number of carbon atoms. Aryloxy groups include, for example, from 6 to 30 carbon atoms (C6-C30 aryloxy groups).

As used herein, the term "heteroalkyl" refers to an alkyl group comprising at least one heteroatom covalently bonded to one or more carbon atoms of the alkyl group, and having a specified number of carbon atoms. Each heteroatom is independently chosen from nitrogen (N), oxygen (O), sulfur (S), and phosphorus (P). Heteroalkyl groups include, for example, from 1 to 30 carbon atoms (C1-C30 heteroalkyl group).

As used herein, the term "heteroalkylaryl" refers to an alkylaryl group comprising at least one heteroatom covalently bonded to one or more carbon atoms of the alkyl group, and having a specified number of carbon atoms. Each heteroatom is independently chosen from nitrogen (N), oxygen (O), sulfur (S), and phosphorus (P). Heteroalkylaryl groups include, for example, from 7 to 30 carbon atoms (C7-C30 heteroalkylaryl group).

As used herein, the term "cycloalkyl" refers to a saturated hydrocarbon ring group, having only carbon ring atoms and having a specified number of carbon atoms. Cycloalkyl groups include, for example, from 3 to 30 carbon atoms (C3-C30 cycloalkyl group).

As used herein, the term "cycloalkenyl" refers to a saturated hydrocarbon ring group, having only carbon ring atoms, having at least one double bond, and having a specified number of carbon atoms. Cycloalkenyl groups include, for example, from 3 to 30 carbon atoms (C3-C30 cycloalkenyl group).

As used herein, the term "cycloalkynyl" refers to a saturated hydrocarbon ring group, having only carbon ring atoms, having at least one triple bond, and having a specified number of carbon atoms. Cycloalkynyl groups include, for example, from 3 to 30 carbon atoms (C3-C30 cycloalkynyl group).

As used herein, the term "alkylene" refers to a straight, branched or cyclic divalent aliphatic hydrocarbon group having a specified number of carbon atoms. Alkylene groups include, for example, from C1 to C30 carbon atoms (C1-C30 alkylene group).

As used herein, the term "alkynelene" refers to a straight or branched chain, divalent hydrocarbon group having at least one carbon-carbon double bond, and having a specified number of carbon atoms. Alkynelene groups include, for example, from C2 to C30 carbon atoms (C2-C30 alkynelene group).

Hereinafter, referring to the drawings, a film for a backlight unit according to an embodiment is described.

FIG. 1 is a schematic view of the film 10 for a backlight unit according to an embodiment.

Referring to FIG. 1, the film for a backlight unit 10 includes a semiconductor nanocrystal-polymer composite film 12 including a matrix polymer 19 including a red semiconductor nanocrystal 13 and a green semiconductor nanocrystal 15 dispersed therein. The matrix polymer 19 is a polymer produced by polymerization of a multifunctional photo-curable oligomer, a mono-functional photo-curable monomer, and a multifunctional photo-curable cross-linking agent.

The multifunctional photo-curable oligomer may maintain mechanical properties of the semiconductor nanocrystal-polymer composite film 12 and dispersion of the semiconductor nanocrystal. Such a multifunctional photo-curable oligomer may be an oligomer including at least two acrylate functional groups or at least two methacrylate functional groups, and in an embodiment, may be an oligomer including about 2 to about 6 acrylate functional groups or about 2 to about 6 methacrylate functional groups. For example, the oligomer may be urethane (meth)acrylate, epoxy (meth)acrylate, polyester (meth)acrylate, acrylic (meth)acrylate, polybutadiene (meth)acrylate, silicone (meth)acrylate, melamine (meth)acrylate, and the like.

The multifunctional photo-curable oligomer may be synthesized by a general method. For example, urethane acrylate may be prepared by reacting aliphatic isocyanate with aliphatic polyol to obtain a prepolymer capped with an isocyanate group at the terminal end, and reacting the prepolymer with hydroxy acrylate.

The multifunctional photo-curable oligomer may have a weight average molecular weight (Mw) of about 1,000 to about 20,000, and in an embodiment, about 5,000 to about 10,000. The multifunctional photo-curable oligomer may have a viscosity of about 10 Pascal×second ("Pa·s") to about 2,000 Pa·s, and in an embodiment, about 20 Pa·s to about 1,000 Pa·s at about 25° C. Within the weight average molecular weight or viscosity ranges, the semiconductor nanocrystal-polymer composite film 12 may maintain improved mechanical properties and dispersion of the semiconductor nanocrystals.

The multifunctional photo-curable oligomer may have an acid value of less than or equal to about 0.1 milligram of KOH/gram ("mg of KOH/g"), and in an embodiment, less than or equal to about 0.01 mg of KOH/g. The acid value, as used herein, refers to an amount of KOH required for neutralizing 1 gram ("g") of the multifunctional photo-curable oligomer. The multifunctional photo-curable oligomer does not have a hydroxyl group or a carboxyl group that may increase an acid value. Within the foregoing acid value ranges, the multifunctional photo-curable oligomer has little acidity, so light emitting characteristics of the semiconductor nanocrystals 13 and 15 may be improved.

The multifunctional photo-curable oligomer may include a group selected from an aliphatic group, an alicyclic group, and an aromatic group which are substituted with an amino group (NRR', wherein R and R' are independently hydrogen or a C1 to C6 alkyl group), an azido group ($-N_3$), an amidino group ($-C(=NH)NH_2$), a hydrazine group ($-NHNH_2$), a hydrazono group ($=N(NH_2)$), an aldehyde group ($-C(=O)H$), a carbamoyl group, a thiol group, or an ester group ($-C(=O)OR$, wherein R is a C1 to C6 alkyl group or a C6 to C12 aryl group). The multifunctional photo-curable oligomer including the forgoing substituting group may have improved affinity for the semiconductor nanocrystals 13 and 15 and thus improve dispersion of the semiconductor nanocrystals 13 and 15. The mono-functional photo-curable monomer may be represented by the following Chemical Formula 1.

$$R^1-X^1 \quad \text{Chemical Formula 1}$$

In Chemical Formula 1, $R^1$ is a substituted or unsubstituted C6 to C30 linear or branched aliphatic group, a substituted or unsubstituted C5 to C30 alicyclic group, or a substituted or unsubstituted C2 to C30 aromatic group, and $X^1$ is an acrylate group, a methacrylate group, an acryloyl group, a methacryloyl group, or a C2 to C10 alkenyl group (e.g., vinyl group, allyl group, butenyl group, and the like).

The aliphatic group may refer to a C6 to C30 linear or branched alkyl group or a C6 to C30 linear or branched alkenyl group, wherein at least one methylene group (—CH$_2$—) of the alkyl group or alkenyl group is optionally replaced by a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group (—C(=O)NR—) (wherein R is hydrogen or a C1 to C10 alkyl group), —NR— (wherein R is hydrogen or a C1 to C10 alkyl group), or a combination thereof.

The alicyclic group may be a C5 to C30 cycloalkyl group, a C5 to C30 cycloalkenyl group, or a C3 to C30 heterocycloalkyl group.

The aromatic group may be a C6 to C30 aryl group or a C2 to C30 heteroaryl group.

In an embodiment, considering dispersion of the semiconductor nanocrystals 13 and 15, in Chemical Formula 1, $R^1$ may be a C6 to C30 alkyl group, and in an embodiment, may be a C8 to C30 alkyl group that has a long chain.

The mono-functional photo-curable monomer may include isobornyl(meth)acrylate, isooctyl(meth)acrylate, lauryl(meth)acrylate, benzoyl(meth)acrylate, norbornyl (meth)acrylate, cyclohexyl(meth)acrylate, n-hexyl(meth) acrylate, adamantyl acrylate, cyclopentyl acrylate, and a combination thereof.

The mono-functional photo-curable monomer may function as a solvent. The mono-functional photo-curable monomer may reduce a viscosity of a composition for the semiconductor nanocrystal-polymer composite film 12 to improve its workability, and improve dispersion of the semiconductor nanocrystals 13 and 15 in the semiconductor nanocrystal-polymer composite film 12.

Luminance intensity after dispersing the semiconductor nanocrystals in the mono-functional photo-curable monomer may be maintained up to about 90% or more, and in an embodiment, to about 95% or more of intrinsic luminance intensity of the semiconductor nanocrystal. The mono-functional photo-curable monomer may maintain improved light emitting characteristics of the semiconductor nanocrystals.

The mono-functional photo-curable monomer may have a solubility parameter of about 8 to about 10 for the semiconductor nanocrystals 13 and 15. Within the foregoing solubility parameter range, dispersion of the semiconductor nanocrystals may be improved.

When a solubility parameter of the mono-functional photo-curable monomer is $\delta_A$, and a solubility parameter of the aromatic hydrocarbon-based solvent or halogenated aliphatic hydrocarbon-based solvent is $\delta_B$, a difference of the solubility parameter $|\delta_A - \delta_B|$ may be less than or equal to about 5, and in an embodiment, equal to or less than about 3. When the difference of the solubility parameter is within the foregoing ranges, dispersion of the semiconductor nanocrystals 13 and 15 may be improved. The aromatic hydrocarbon-based solvent may be a C6 to C30 arene compound, and for example, benzene, toluene, ethylbenzene, xylene, and the like, and the halogenated aliphatic hydrocarbon-based solvent may be a C1 to C30 alkane compound substituted with a halogen (F, Cl, Br, or I), and for example, chloroform, dichloromethane, carbon tetrachloride, 1,2-dichloroethane, and the like.

The $R^1$ may be selected from an aliphatic group, an alicyclic group, and an aromatic group which are substituted with one substituent selected from an amino group (NRR', wherein R and R' are independently hydrogen or a C1 to C6 alkyl group), an azido group (—N$_3$), an amidino group (—C(=NH)NH$_2$), a hydrazine group (—NHNH$_2$), a hydrazono group (=N(NH$_2$)), an aldehyde group (—C(=O)H), a carbamoyl group (—C(=O)NH$_2$), a thiol group (—SH), or an ester group (—C(=O)OR, wherein R is a C1 to C6 alkyl group or a C6 to C12 aryl group), and a combination thereof. The $R^1$ substituted with the forgoing substituents may have improved affinity for the semiconductor nanocrystals 13 and 15 and thus may improve dispersion of the semiconductor nanocrystals 13 and 15.

The multifunctional photo-curable cross-linking agent may be a compound represented by the following Chemical Formula 2.

Chemical Formula 2

In Chemical Formula 2, $R^2$ is a substituted or unsubstituted C3 to C30 linear or branched aliphatic group, a substituted or unsubstituted C3 to C30 alicyclic group, a substituted or unsubstituted C2 to C30 aromatic group, $X^2$ is an acrylate group, or a methacrylate group, and b is greater than or equal to 2, and does not exceed a valence of $R^2$.

In an embodiment, in Chemical Formula 2, $R^2$ may be a substituted or unsubstituted C3 to C30 linear or branched aliphatic alcohol group, a substituted or unsubstituted C3 to C30 alicyclic alcohol group, or a substituted or unsubstituted C2 to C30 aromatic alcohol group.

The aliphatic group may be a C3 to C30 linear or branched alkyl group or C3 to C30 linear or branched alkenyl group, in an embodiment, may be a C6 to C30 linear or branched alkyl group or a C6 to C30 linear or branched alkenyl group, and in another embodiment, may be a C8 to C30 linear or branched alkyl group or a C8 to C30 linear or branched alkenyl group, wherein at least one methylene group (—CH$_2$—) of the alkyl group or alkenyl group is optionally replaced by a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group (—C(=O) NR—) (wherein R is hydrogen or a C1 to C10 alkyl group), —NR— (wherein R is hydrogen or a C1 to C10 alkyl group), or a combination thereof.

The alicyclic group may be a C5 to C30 cycloalkyl group, a C5 to C30 cycloalkenyl group, or a C3 to C30 heterocycloalkyl group.

The aromatic group may be a C6 to C30 aryl group or a C2 to C30 heteroaryl group.

In an embodiment, $R^2$ of the Chemical Formula 2 may be an alicyclic group, for example a C5 to C30 cycloalkyl group, a C5 to C30 cycloalkenyl group, or a C3 to C30 heterocycloalkyl group.

The multifunctional photo-curable cross-linking agent may be selected from difunctional meth(acrylate) such as hexanediol di(meth)acrylate, tricyclodecane dimethanol di(meth)acrylate, 1,10-decanediol di(meth)acrylate, butanediol di(meth)acrylate, neophenylglycol di(meth)acrylate, neopentylglycol di(meth)acrylate, nonylpropyleneglycol di(meth)acrylate, dipropyleneglycol di(meth)acrylate, diethyleneglycol di(meth)acrylate, ethyleneglycol di(meth)acrylate, tetratriethyleneglycol di(meth)acrylate, ethoxylated dibisphenol A di(meth)acrylate, triethyleneglycol di(meth) acrylate, and the like; tri(meth)acrylate such as trimethylolpropane tri(meth)acrylate, pentaerythritol tri(meth)acrylate, ethoxylated trimethylol(meth)propane triacrylate, ethylene oxide addition trimethylolpropane tri(meth)acrylate ("EO-TMPTA"), glycerine propyleneoxide addition tri(meth)acrylate ("PETTA"), ethoxy addition pentaerythritol tetra(meth) acrylate and dipentaerythritol hexa(meth)acrylate ("DPHA"), and the like.

The $R^2$ may be selected from an aliphatic group, an alicyclic group, and an aromatic group which are substituted with one substituent selected from an amino group (NRR', wherein R and R' are independently hydrogen or a C1 to C6 alkyl group), an azido group (—$N_3$), an amidino group (—C(=NH)$NH_2$), a hydrazine group (—$NHNH_2$), a hydrazono group (=N($NH_2$), an aldehyde group (—C(=O)H), a carbamoyl group (—C(=O)$NH_2$), a thiol group (—SH), or an ester group (—C(=O)OR, wherein R is a C1 to C6 alkyl group or a C6 to C12 aryl group), and a combination thereof. The $R^2$ substituted with the foregoing substituents may have improved affinity for the semiconductor nanocrystals 13 and 15 and thus may improve dispersion of the semiconductor nanocrystals 13 and 15. In the matrix polymer 19, a content ($A_1$) of a first structural unit derived from the multifunctional photo-curable oligomer, a content ($A_2$) of a second structural unit derived from mono-functional photo-curable monomer, and a content ($A_3$) of a third structural unit derived from multifunctional photo-curable cross-linking agent satisfy the following Equation 1.

$$A_1 < (A_2 + A_3) \quad \text{Equation 1}$$

The $A_1:(A_2+A_3)$ ratio may be from about 10:90 to about 55:45, and in an embodiment, from about 15:85 to about 40:60, and may be a weight ratio. Within the above the ranges, dispersion of the semiconductor nanocrystals 13 and 15 may be ensured sufficiently and mechanical strength such as tensile strength, tensile elongation, and the like may be improved.

In the matrix polymer 19, the first structural unit derived from the multifunctional photo-curable oligomer may be included in an amount of greater than or equal to about 10 parts by weight and less than or equal to about 45 parts by weight, and in an embodiment, in an amount of greater than or equal to about 20 parts by weight and less than or equal to about 40 parts by weight based on 100 parts by weight of the matrix polymer 19. Within the above ranges, film-forming properties and mechanical properties of the matrix polymer may be improved.

In the matrix polymer 19, the second structural unit derived from the mono-functional photo-curable monomer may be included in an amount of greater than or equal to about 10 parts by weight and less than or equal to about 50 parts by weight, and in an embodiment, may be greater than or equal to about 20 parts by weight and less than or equal to about 40 parts by weight based on 100 parts by weight of the matrix polymer 19. Within the above ranges, mechanical properties of semiconductor nanocrystal-polymer composite film 12 are maintained and dispersion of the semiconductor nanocrystal 13 and 15 is improved.

In the matrix polymer 19, the third structural unit derived from the multifunctional photo-curable cross-linking agent may be included in an amount of greater than or equal to about 10 parts by weight and less than or equal to about 70 parts by weight, and in an embodiment, greater than or equal to about 20 parts by weight and less than or equal to about 60 parts by weight based on 100 parts by weight of the matrix polymer. Within the above ranges, mechanical properties of semiconductor nanocrystal-polymer composite film 12 and dispersion of the semiconductor nanocrystal 13 and 15 are improved.

The mono-functional photo-curable monomer and multifunctional photo-curable cross-linking agent may include the same functional group. When the mono-functional photo-curable monomer and multifunctional photo-curable cross-linking agent include the same functional group, mechanical properties of a film obtained by photocuring may be improved.

In the matrix polymer 19 of the semiconductor nanocrystal-polymer composite film 12, semiconductor nanocrystals 13 and 15 having color reproducibility and color purity are dispersed.

The semiconductor nanocrystals 13 and 15 may be selected from a Group II-VI compound, a Group III-V compound, a Group IV-VI compound, a Group IV element, a Group IV compound, and a combination thereof, wherein the term "Group" refers to a group of the Periodic Table of the Elements.

The Group II-VI compound includes a binary compound selected from CdSe, CdTe, ZnS, ZnSe, ZnTe, ZnO, HgS, HgSe, HgTe, MgSe, MgS, and a mixture thereof; a ternary compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; or a quaternary compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The Group III-V compound includes a binary compound selected from GaN, GaP, GaAs, GaSb, AlN, AlP, AlAs, AlSb, InN, InP, InAs, InSb, and a mixture thereof; a ternary compound selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; or a quaternary compound selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof. The Group IV-VI compound includes a binary compound selected from SnS, SnSe, SnTe, PbS, PbSe, PbTe, and a mixture thereof; a ternary compound selected from SnSeS, SnSeTe, SnSTe, PbSeS, PbSeTe, PbSTe, SnPbS, SnPbSe, SnPbTe, and a mixture thereof; or a quaternary compound selected from SnPbSSe, SnPbSeTe, SnPbSTe, and a mixture thereof. The Group IV element may be selected from Si, Ge, and a mixture thereof. The Group IV compound includes a binary compound selected from SiC, SiGe, and mixture thereof.

Herein, the element, the binary compound, the ternary compound, or the quaternary compound may be present in a particle having a substantially uniform concentration or in a particle having different concentration distributions in the same particle. In addition, each particle may have a core/shell structure in which a first semiconductor nanocrystal is surrounded by a second semiconductor nanocrystal. The core and shell may have an interface, which may have an element concentration gradient decreasing in a direction from the surface of the particle to the center thereof.

The semiconductor nanocrystals 13 and 15 may have a full width at half maximum ("FWHM") of less than or equal to about 45 nanometers ("nm"), in an embodiment, less than or equal to about 40 nm, and in another embodiment, less than or equal to about 30 nm in the light emitting wavelength spectrum. Within the range, color purity or color reproducibility of the film for a backlight unit 10 may be improved.

The semiconductor nanocrystals 13 and 15 may have a particle diameter (e.g., an average largest particle diameter) ranging from about 1 nanometer ("nm") to about 100 nm, in an embodiment, about 1 nm to about 50 nm, and in another embodiment, about 1 nm to about 10 nm, or about 2 nm to about 25 nm.

In addition, the semiconductor nanocrystals 13 and 15 may have a commonly-used shape in this art so the shape is not specifically limited. Examples thereof may include spherical, elliptical, tetrahedral, octahedral, cylindrical, polygonal, conical, columnar, tubular, helical, pyramidal, multi-armed, or cubic nanoparticles, nanotubes, nanowires, nanofiber, nanoplate particles, or the like.

The semiconductor nanocrystal-polymer composite film 12 may include the semiconductor nanocrystals 13 and 15 in an amount of about 0.1 percent by weight ("wt %") to about 20 wt %, in an embodiment, about 0.2 wt % to about 15 wt %, and in another embodiment, about 0.3 wt % to about 10 wt %. When the amount of the semiconductor nanocrystal is within the above ranges, good dispersion of the semiconductor nanocrystal in the composite film may be obtained and color conversion ranges may be easily controlled.

Even though the semiconductor nanocrystal-polymer composite film 12 includes a mixture of a red semiconductor nanocrystal and a green semiconductor nanocrystal in FIG. 1, the semiconductor nanocrystal-polymer composite film 12 may include a first layer including the red semiconductor nanocrystal 13 and a second layer including a green semiconductor nanocrystal 15.

The semiconductor nanocrystal-polymer composite film 12 may further include an inorganic oxide. The inorganic oxide may include silica, alumina, titania, zirconia, and a combination thereof. Such an inorganic oxide may act as a light diffusion material. The inorganic oxide may be included in an amount of about 1 wt % to about 20 wt %, and in an embodiment, about 5 wt % to 15 wt % based on the total weight of the semiconductor nanocrystal-polymer composite film 12.

The semiconductor nanocrystal-polymer composite film 12 may have a thickness of about 10 micrometers to about 100 micrometers, and in an embodiment, 10 micrometers to about 75 micrometers. The semiconductor nanocrystal-polymer composite film 12 may have storage modulus of about 25 megaPascal ("MPa") to about 85 MPa and tensile strength of about 15 MPa to about 35 MPa.

The semiconductor nanocrystals 13 and 15 dispersed in the semiconductor nanocrystal-polymer composite film 12 may have a particle size of about 0.2 micrometer to about 1 micrometer, and in an embodiment, about 0.3 micrometer to about 0.7 micrometer. Within the above ranges, the semiconductor nanocrystals 13 and 15 may be uniformly dispersed in the matrix polymer 9. The film for a backlight unit 10 may further include barrier films 17a and 17b disposed on at least one side of the semiconductor nanocrystal-polymer composite film 12. The film for a backlight unit 10 may further include one of the barrier films 17a and 17b.

The barrier film 17a and 17b may include a polymer selected from a polyester, a polycarbonate, a polyolefin, a cyclic olefin polymer ("COP"), a polyimide (which includes polyetherimides), a polymerization product of a first monomer including at least two thiol (—SH) groups at a terminal end and a second monomer including at least two carbon-carbon unsaturated bond-containing groups, and a combination thereof. The polyester may include polyethyleneterephthalate, polybutyleneterephthalate, polytrimethylene terephthalate, polyethylenenaphthalate, polyvinylacetate, polyethylene adipate, polyhydroxyalkanoate, polyhydroxybutyrate, poly(3-hydroxybutyrate-co-3-hydroxyvalerate, and the like. The polyolefin may include polyethylene, polypropylene, polymethylpentene, polybutene-1, polystyrene, and the like. The cyclic olefin polymer refers to a polymer obtained by chain copolymerization of cyclic monomers such as norbornene, tetracyclododecene with linear olefin monomers such as ethylene.

The polymerization product of the first monomer including at least two thiol (—SH) groups at the terminal end and a second monomer including at least two carbon-carbon unsaturated bond-containing groups may be a polymer of a first monomer including at least two thiol (—SH) groups at a terminal end represented by the following Chemical Formula 3 and a second monomer including at least two carbon-carbon unsaturated bond-containing groups represented by the following Chemical Formula 4.

Chemical Formula 3

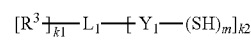

In Chemical Formula 3, $R^3$ is hydrogen; a substituted or unsubstituted C1 to C30 alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a substituted or unsubstituted C2 to C30 alkenyl group; a substituted or unsubstituted C2 to C30 alkynyl group; a substituted or unsubstituted C3 to C30 alicyclic organic group including a double bond or triple bond in a ring; a substituted or unsubstituted C3 to C30 heterocycloalkyl group including a double bond or triple bond in a ring; a C3 to C30 alicyclic group substituted with a C2 to C30 alkenyl group or a C2 to C30 alkynyl group; a C3 to C30 heterocycloalkyl group substituted with a C2 to C30 alkenyl group or a C2 to C30 alkynyl group; a hydroxy group (—OH); an amino group (—NH$_2$); a substituted or unsubstituted C1 to C30 amine group (—NRR', wherein R and R' are independently hydrogen or a C1 to C20 alkyl group); an isocyanate group (—N=C=O), an isocyanurate group; a (meth)acrylate group; a halogen; —ROR' (wherein R is a substituted or unsubstituted C1 to C20 alkylene group and R' is hydrogen or a C1 to C20 alkyl group); —C(=O)OR' (wherein R' is hydrogen or a C1 to C20 alkyl group); —CN; or —C(=O)ONRR' (wherein R and R' are independently hydrogen or a C1 to C20 alkyl group), $L_1$ is a single bond; a substituted or unsubstituted C1 to C30 alkylene group; a substituted or unsubstituted C6 to C30 arylene group; a substituted or unsubstituted C3 to C30 heteroarylene group; a substituted or unsubstituted C3 to C30 cycloalkylene group; or a substituted or unsubstituted C3 to C30 heterocycloalkylene group, $Y_1$ is a single bond; a substituted or unsubstituted C1 to C30 alkylene group; a substituted or unsubstituted C2 to C30 alkenylene group; or a C1 to C30 alkylene group or a C2 to C30 alkenylene group wherein at least one methylene group (—CH$_2$—) is replaced by a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group (—C(=O)NR—) (wherein R is hydrogen or a C1 to C10 alkyl group), —NR— (wherein R is hydrogen or a C1 to C10 alkyl group), or a combination thereof, m is an integer of greater than or equal to 1, k1 is an integer of 0 or greater than or equal to 1, k2 is an integer of greater than or equal to 1, and the sum of m and k2 is an integer of greater than or equal to 3.

In the above Chemical Formula 3, m does not exceed the valence of $Y_1$, and k1 and k2 do not exceed the valence of the $L_1$. In an embodiment, the sum of m and k2 ranges from 3 to 6, in another embodiment, from 3 to 5, and in still another embodiment, m may be 1, k1 may be 0, and k2 may be 3 or 4.

Chemical Formula 4

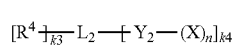

In Chemical Formula 4,

X is a C2 to C30 aliphatic organic group including a carbon-carbon double bond or a carbon-carbon triple bond, a C6 to C30 aromatic organic group including a carbon-carbon double bond or a carbon-carbon triple bond, or a C3 to C30 alicyclic organic group including a carbon-carbon double bond or a carbon-carbon triple bond, $R^4$ is hydrogen; a substituted or unsubstituted C1 to C30 alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a substituted or unsubstituted C2 to C30 alkenyl group; a substituted or unsubstituted C2 to C30 alkynyl group; a substituted or unsubstituted C3 to C30 alicyclic organic group including a double bond or triple bond in a ring; a substituted or unsubstituted C3 to C30 heterocycloalkyl group including a double bond or triple bond in a ring; a C3 to C30 alicyclic group substituted with a C2 to C30 alkenyl group or a C2 to C30 alkynyl group; a C3 to C30 heterocycloalkyl group substituted with a C2 to C30 alkenyl group or a C2 to C30 alkynyl group; a hydroxy group (—OH); an amino group (—$NH_2$); a substituted or unsubstituted C1 to C30 amine group (—NRR', wherein R and R' are independently hydrogen or a C1 to C30 alkyl group); an isocyanate group (—N=C=O); an isocyanurate group; a (meth)acrylate group; a halogen; —ROR' (wherein R is a substituted or unsubstituted C1 to C20 alkylene group and R' is hydrogen or a C1 to C20 alkyl group); an acyl halide group (—RC(=O)X, wherein R is a substituted or unsubstituted alkylene group, and X is a halogen); —C(=O)OR' (wherein R' is hydrogen or a C1 to C20 alkyl group); —CN; or —C(=O)ONRR' (wherein R and R' are independently hydrogen or a C1 to C20 alkyl group), $L_2$ is a single bond, a substituted or unsubstituted C1 to C30 alkylene group, a substituted or unsubstituted C6 to C30 arylene group, or a substituted or unsubstituted C3 to C30 heteroarylene group, $Y_2$ is a single bond; a substituted or unsubstituted C1 to C30 alkylene group; a substituted or unsubstituted C2 to C30 alkenylene group; or a C1 to C30 alkylene group or a C2 to C30 alkenylene group wherein at least one methylene group (—$CH_2$—) is replaced by a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group (—C(=O)NR—) (wherein R is hydrogen or a C1 to C10 alkyl group), —NR— (wherein R is hydrogen or a C1 to C10 alkyl group), or a combination thereof, n is an integer of greater than or equal to 1, k3 is an integer of 0 or greater than or equal 1, k4 is an integer of greater than or equal to 1, and the sum of n and k4 is an integer of greater than or equal to 3.

In Chemical Formula 4, n does not exceed the valence of $Y_2$, and k3 and k4 does not exceed the valence of the $L_2$. In an embodiment, the sum of n and k4 may range from 3 to 6, in an embodiment, 3 to 5, and in another embodiment, n is 1, k3 is 0, and k4 is 3 or 4.

The first monomer of the above Chemical Formula 3 may include compounds of the following Chemical Formulas 3-2 to 3-5.

Chemical Formula 3-2

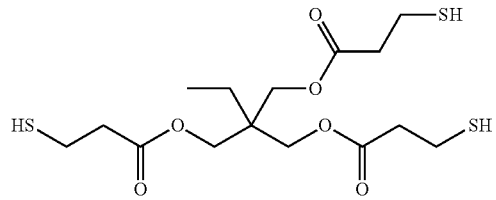

Chemical Formula 3-3

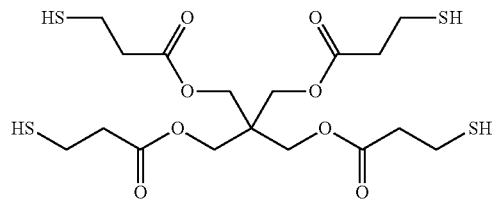

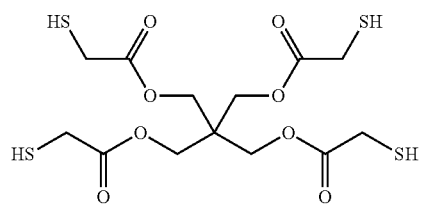

Chemical Formula 3-5

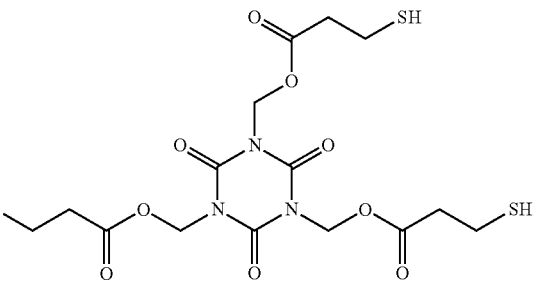

The second monomer of the above Chemical Formula 4 may include the compounds represented by the following Chemical Formulas 4-3 to 4-5.

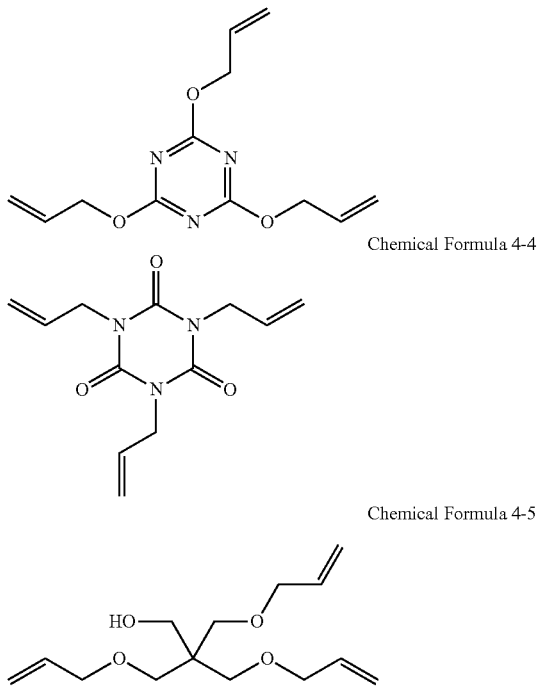

Chemical Formula 4-3

Chemical Formula 4-4

Chemical Formula 4-5

The barrier films 17a and 17b may further include an inorganic oxide. The inorganic oxide may be selected from silica, alumina, titania, zirconia, and a combination thereof. These inorganic oxides may act as a light diffusion material. The inorganic oxide may be included in an amount of about 1 wt % to about 20 wt %, and in an embodiment, from about 1% to about 10%, based on the total amount of each barrier films 17a and 17b. In addition, when included within the range, the film is easily fabricated, moisture permeation may be decreased. Such a film may be conveniently used as a diffusion film.

The barrier films 17a and 17b may also have a protruded and recessed pattern having a predetermined size on the surface without contacting the semiconductor nanocrystal-polymer composite film 12. The barrier films 17a and 17b with the protruded and recessed pattern on the surfaces may diffuse light emitted from the LED light source.

The barrier films 17a and 17b may have oxygen permeability ranging from about 0.01 cubic centimeter×millimeter per (square meter×day×atmosphere) ("cm$^3$×mm·/m$^2$·×day·×atm") to about 0.5 cm$^3$×mm·/m$^2$·×day·×atm and a water vapor permeability rate of about 0.001 gram per (meter×day) ("g/m$^2$·×day") to about 0.01 g/m$^2$·×day. When barrier films 17a and 17b have the oxygen permeability and the moisture permeation within the foregoing ranges, the semiconductor nanocrystal may be stably protected against the extraneous conditions.

The barrier films 17a and 17b may have a thickness of about 10 nm to about 100 micrometers ("μm"), and in an embodiment, about 1 μm to about 50 μm on a surface of the semiconductor nanocrystal-polymer composite film 12.

The semiconductor nanocrystal-polymer composite film 12 may be manufactured as follows: semiconductor nanocrystals dispersed in a solvent is mixed with the mono-functional photo-curable monomer to prepare a mixture; mixing a multifunctional photo-curable oligomer, a multifunctional photo-curable cross-linking agent, and a photoinitiator with the mixture to prepare a photo-curable composition; and coating the photo-curable composition on a substrate to provide a photo-curable composition coating; and photo-curing the photo-curable composition coating to prepare the semiconductor nanocrystal-polymer composite film 12.

The method of mixing is not particularly critical and may be carried out by a variety of means, for example dispersion, blending, stirring, sonication, sparging, milling, shaking, centrifugal circulating pump mixing, blade mixing, impact mixing, jet mixing, homogenization, co-spraying, high sheer mixing, single pass and multi-pass mixing, and the like.

The solvent may be an aromatic hydrocarbon-based solvent or a halogenated aliphatic hydrocarbon-based solvent.

The mono-functional photo-curable monomer has good affinity for a solvent where the semiconductor nanocrystal is dispersed and organic ligands positioned on a surface of the semiconductor nanocrystal to improve dispersion of the semiconductor nanocrystal. The mono-functional photo-curable monomer is mixed with the semiconductor nanocrystal, and then mixed with the multifunctional photo-curable oligomer, multifunctional photo-curable cross-linking agent, and photoinitiator. Thereby, particles of the semiconductor nanocrystals may be uniformly distributed in the photo-curable composition.

The use amounts of the mono-functional photo-curable monomer, multifunctional photo-curable oligomer, and multifunctional photo-curable cross-linking agent may be adjusted in accordance with each content ($A_1$, $A_2$, and $A_3$) of structural units in the matrix polymer 19.

The photoinitiator may include at least one compound selected from 1-hydroxycyclohexylphenylketone, 2-methyl-1(4-(methylthio)phenyl)-2-morpholinyl-1-propane, hydroxyketone, benzophenone, benzyldimethylketone, 2-hydroxy-2-methyl-1-phenyl-propan-1-one, bisacylphosphineoxide, diphenyl(2,4,6-trimethylbenzoyl)-phosphineoxide and phosphineoxide phenylbis(2,3,6-trimethylbenzoyl). The photoinitiator may be used in an amount of about 0.1 to about 5 parts by weight, and in an embodiment, of about 0.1 to about 3 parts by weight, based on 100 parts by weight of the photo-curable composition.

The photo-curable composition may be coated on a substrate using spin coating, screen printing, gravure printing, and the like.

The substrate may be a glass, transparent plastics, and the like having light transmittance of greater than or equal to 85%, and the transparent plastics may include polyester, polycarbonate, polyimide, polyolefin, and the like, but is not limited thereto. The transparent plastics may act as barrier films 17a and 17b of the semiconductor nanocrystal-polymer composite film 12.

The photo-curing may be performed by radiating UV at a dose of about 500 milliJoule per square centimeter ("mJ/cm$^2$") to about 2,000 mJ/cm$^2$.

As described above, the semiconductor nanocrystal-polymer composite film 12 may be prepared by using a photo-curable composition including the semiconductor nanocrystal, multifunctional photo-curable oligomer, mono-functional photo-curable monomer, multifunctional photo-curable cross-linking agent, and photoinitiator. When a light emitting wavelength of the photo-curable composition is $\lambda_A$ and an intrinsic light emitting wavelength of the semiconductor nanocrystal is $\lambda_B$, a difference $|\lambda_A-\lambda_B|$ may be in the range of less than or equal to about 5 nm, and in an embodiment, may be less than or equal to about 3 nm. A full width of half maximum of the photo-curable composition is nearly consistent with an intrinsic full width of half maximum of the semiconductor nanocrystal, and luminous efficiency of the photo-curable composition is 80% of luminous efficiency of the semiconductor nanocrystal. When the light emitting wavelength, full width of half maximum, and luminous efficiency are within the above ranges, the photo-curable composition does not inhibit light emitting characteristics of the semiconductor nanocrystal. The semiconductor nanocrystal-polymer composite film 12 may have a predetermined pattern on at least one surface. The predetermined pattern may have a protruded and/or recessed portion.

The predetermined pattern may be provided as follows: between coating the photo-curable composition and photo-curing processes in the method of manufacturing semiconductor nanocrystal-polymer composite film, the photo-curable composition coating may be contacted with a mold with a predetermined pattern, and after the pattern is formed the mold is removed. The predetermined pattern of the semiconductor nanocrystal-polymer composite film 12 may be further coated with the photo-curable composition to provide a semiconductor nanocrystal-polymer composite film having at least two thin layers.

An adhesion layer may be further positioned between the semiconductor nanocrystal-polymer composite film 12 and barrier films 17a and 17b, even though FIG. 1 does not show the adhesion layer. The adhesion layer may be made of a pressure sensitive adhesive having excellent transparency. When the barrier film 17b is a substrate, the adhesion layer may not be needed.

A protection film may be positioned on an outer surface of the film for a backlight unit 10 of FIG. 1, that is to say, one side of barrier films 17a and 17b not contacting the semiconductor nanocrystal-polymer composite film 12. The protection film may be made of polyester such as polyethylene terephthalate as a releasing film.

Figure 2:
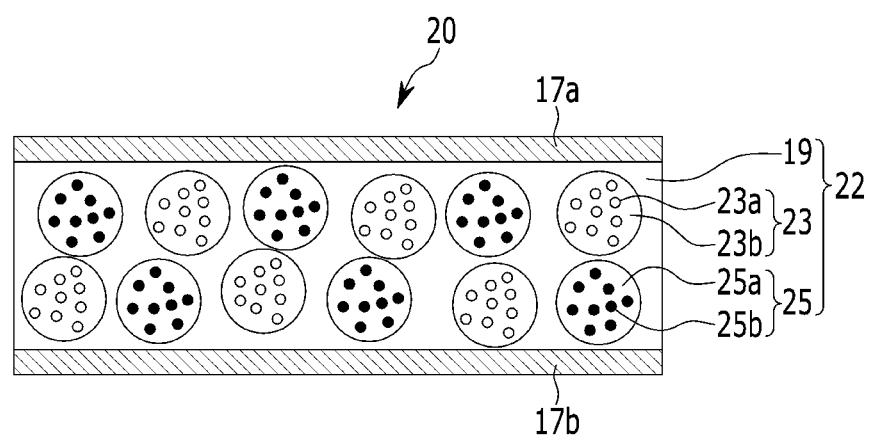
FIG. 2 is a schematic view of a film for a backlight unit according to another embodiment.

FIG. 2 is a schematic view of a film 20 for a backlight unit according to another embodiment.

Referring to FIG. 2, the film 20 for a backlight unit includes a semiconductor nanocrystal-polymer composite film 22 including a first composite 23 including a red semiconductor nanocrystal 23a and a first transparent matrix 23b; a second composite 25 including a green semiconductor nanocrystal 25a and a second transparent matrix 25b; and a matrix polymer 19. The red semiconductor nanocrystal 23a and green semiconductor nanocrystal 25a are the same as the semiconductor nanocrystals 13 and 15 shown in FIG. 1. As shown in FIG. 2, a primary particle of the red semiconductor nanocrystal 23a forms a cluster to provide a secondary particle of a first composite 23, and a primary particle of the green semiconductor nanocrystal 25a forms a cluster to provide a secondary particle of a second composite 25.

The first transparent matrix 23b and the second transparent matrix 25b may be a silicone resin; an epoxy resin; a (meth)acrylate-based resin; an organic/inorganic hybrid polymer; polycarbonate; polystyrene; polyolefin such as polyethylene, polypropylene, polyisobutylene, and the like; a copolymer of a first monomer including at least two thiol (—SH) groups at a terminal end and a second monomer including at least two carbon-carbon unsaturated bond-containing groups; silica; metal oxide; or a combination thereof.

Herein, the copolymer of a first monomer including at least two thiol (—SH) groups at a terminal end and a second monomer including at least two carbon-carbon unsaturated bond-containing groups is the same as described with regard to the barrier films 17a and 17b. The metal oxide may include alumina, titania, zirconia, and the like.

The semiconductor nanocrystal-polymer composite film 22 shown in FIG. 2 is prepared by encapsulating the semiconductor nanocrystal 23a and 25a with the first transparent matrix 23b or the second transparent matrix 25b to provide the first composite 23 and the second composite 25 and dispersing the first composite 23 and the second composite 25 in a matrix polymer 19.

The matrix polymer 19 is a polymer produced by polymerization of a multifunctional photo-curable oligomer, a mono-functional photo-curable monomer, and a multifunctional photo-curable cross-linking agent, and is the same as the matrix polymer 19 shown in FIG. 1.

The semiconductor nanocrystal-polymer composite film 22 shown in FIG. 2 includes a mixture of the first composite 23 including the red semiconductor nanocrystal 23a and the first transparent matrix 23b; and the second composite 25 includes a mixture of the green semiconductor nanocrystal 25a and the second transparent matrix 25b. Alternately, a first layer including the first composite 23 and a second layer including the second composite 25 may be positioned.

The first composite 23 and the second composite 25 may each have particle size of less than or equal to about 2 micrometers, in an embodiment, less than or equal to about 1 micrometer, and in another embodiment, about 100 nanometers to about 2 micrometers or about 100 nanometers to about 1 micrometer.

An adhesion layer may be further positioned between the semiconductor nanocrystal-polymer composite film 22 and barrier films 17a and 17b, even though FIG. 2 does not show the adhesion layer. The adhesion layer may be made of a pressure sensitive adhesive having excellent transparency. When the barrier film 17b is a substrate, the adhesion layer may not be needed.

A protection film may be positioned on an outer surface of the film for a backlight unit 20 of FIG. 2, that is to say, one side of barrier films 17a and 17b not contacting the semiconductor nanocrystal-polymer composite film 22. The protection film may be made of polyester such as polyethylene terephthalate as a releasing film.

Figure 3:
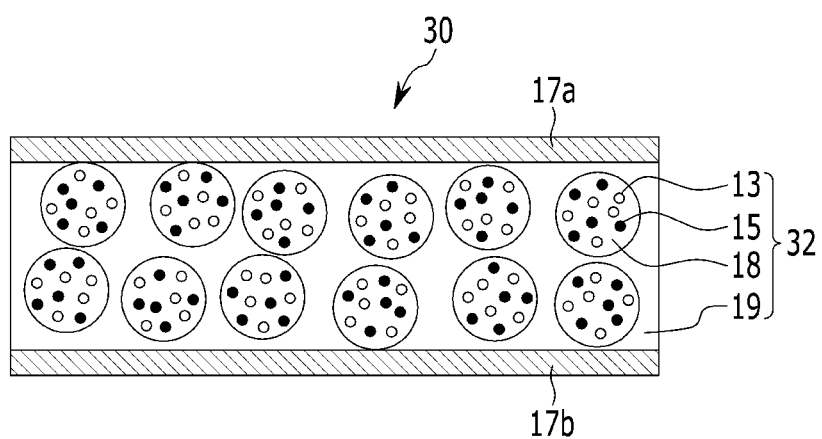
FIG. 3 is a schematic view of a film for a backlight unit according to another embodiment.

FIG. 3 is a schematic view of a film 30 for a backlight unit according to another embodiment.

Referring to FIG. 3, the film for a backlight unit 30 includes semiconductor nanocrystal-polymer composite film 32 including a transparent matrix 18 encapsulating a red semiconductor nanocrystal 13 and a green semiconductor nanocrystal 15, which is dispersed in the matrix polymer 19. As shown in FIG. 3, primary particles of the red semiconductor nanocrystal 13 and green semiconductor nanocrystal 15 form cluster to provide a secondary particle of the composite.

The composite may have a particle size of less than or equal to about 2 micrometers, in an embodiment, less than or equal to about 1 micrometer, and in another embodiment, about 100 nanometers to about 2 micrometers or about 100 nanometers to about 1 micrometer.

An adhesion layer may be further positioned between the semiconductor nanocrystal-polymer composite film 32 and barrier films 17a and 17b, even though FIG. 3 does not show the adhesion layer. The adhesion layer may be made of a pressure sensitive adhesive having excellent transparency. When the barrier film 17b is a substrate, the adhesion layer may not be needed.

A protection film may be positioned on an outer surface of the film for a backlight unit 30 of FIG. 3, that is to say, one side of barrier films 17a and 17b not contacting the semiconductor nanocrystal-polymer composite film 32. The protection film may be made of polyester such as polyethylene terephthalate as a releasing film.

The film for a backlight units 20 and 30 shown in FIGS. 2 and 3 may be prepared by encapsulating a semiconductor nanocrystal by transparent matrix to provide a cluster and dispersing the same in a solvent; mixing the cluster with a mono-functional photo-curable monomer to provide a mixture; mixing the mixture with a multifunctional photo-curable oligomer, a multifunctional photo-curable cross-linking agent, and a photoinitiator to provide a photo-curable composition; and coating the photo-curable composition on a substrate followed by photo-curing to provide a film.

Figure 4:
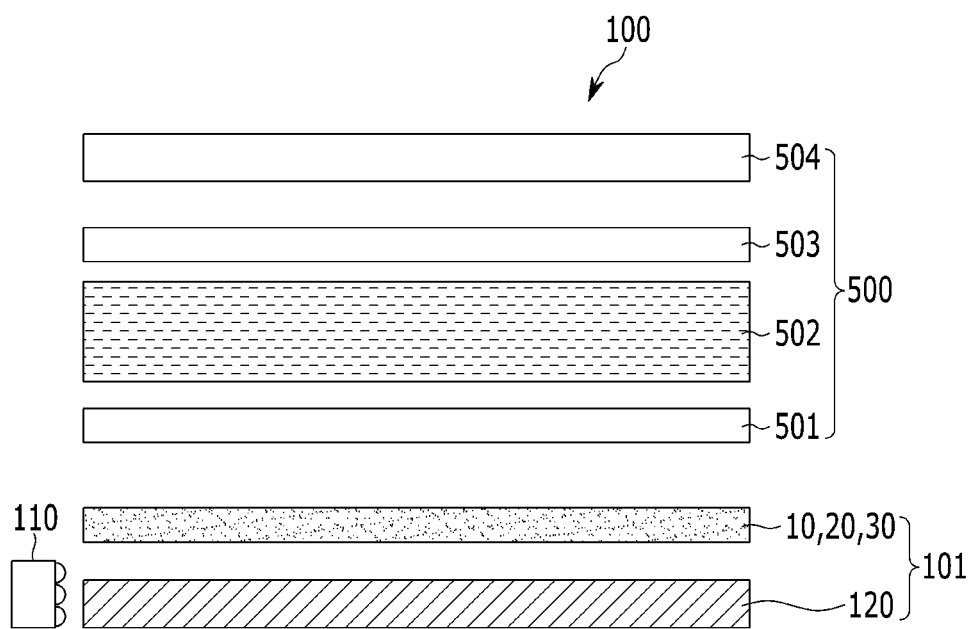
FIG. 4 is a schematic view of a liquid crystal display device according to another embodiment.
Figure 5:
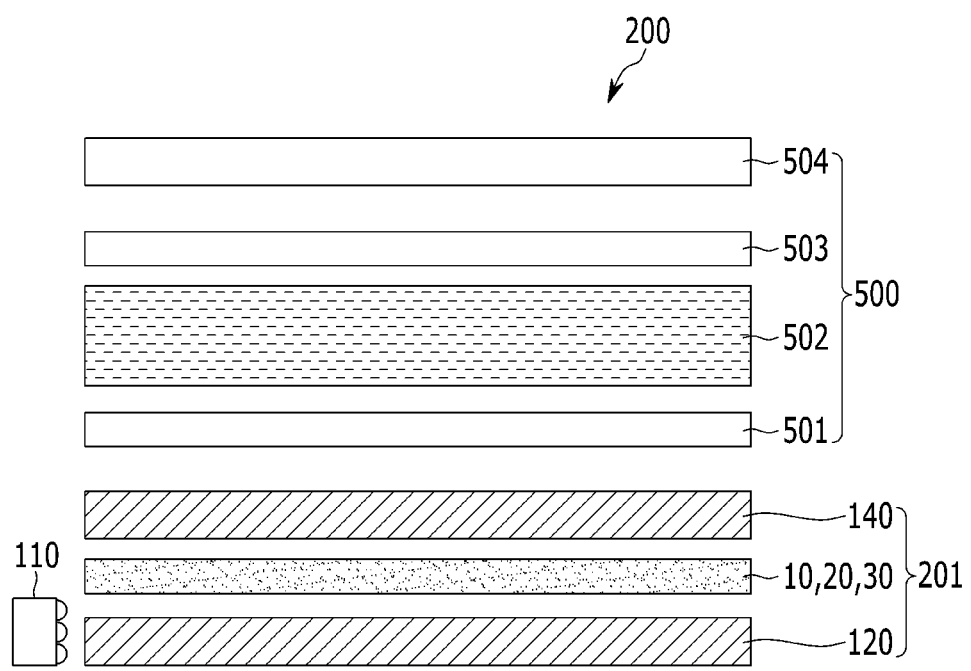
FIG. 5 is a schematic view of a liquid crystal display device according to another embodiment.
Figure 6:
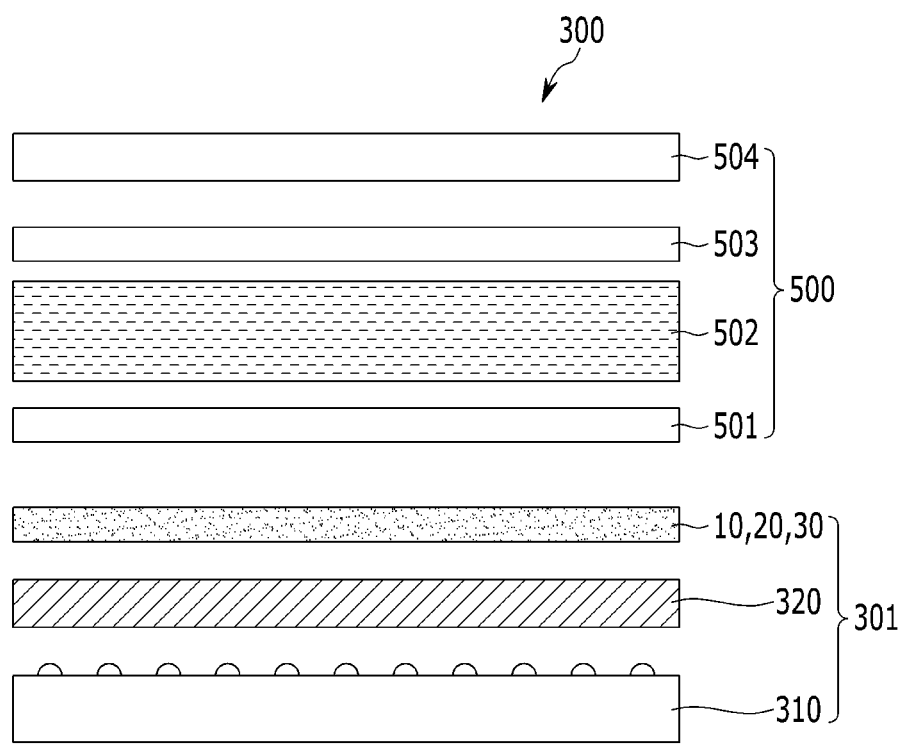
FIG. 6 is a schematic view of a liquid crystal display device according to another embodiment.

Hereinafter, referring to FIGS. 4 to 6, liquid crystal display devices including the films for backlight units 10, 20, and 30 are described. FIGS. 4 to 6 are schematic views of liquid crystal display devices 100, 200, and 300 including films for a backlight unit according to embodiments.

Referring to FIG. 4, the liquid crystal display device 100 includes a backlight unit 101 and a liquid crystal panel 500 realizing a predetermined colored image using white light provided from the backlight unit 101.

The backlight unit 101 includes a light emitting diode ("LED") light source 110, the films 10, 20, and 30 for a backlight unit to convert the light emitted from the LED light source 110 into white light, and a light guide panel 120 disposed therebetween to guide the light emitted from the LED light source 110 toward the films 10, 20, and 30 for a backlight unit. The LED light source 110 includes a plurality of LED chips emitting lights having predetermined wavelengths. The LED light source 110 may be a blue light-emitting LED light source or an ultraviolet ("UV")-emitting LED light source.

A reflector (not shown) may be further positioned on the lower side of the light guide panel 120.

The films 10, 20, and 30 for a backlight unit are disposed separate from the LED light source 110 and acts as a light converting layer to convert light emitted from the LED light source 110 to white light and thus provides the white light to the liquid crystal panel 500.

When the light emitted from the LED light source 110 is passed through the films 10, 20, and 30 for a backlight unit including semiconductor nanocrystal, blue light, green light, and red light are mixed to emit white light. By changing the compositions and sizes of semiconductor nanocrystal in the films 10, 20, and 30 for a backlight unit, the blue, green, and red lights may be controlled to a desirable ratio so as to provide white light having excellent color reproducibility and color purity. Such white light may have color coordinates where Cx is about 0.20 to about 0.50 and Cy is about 0.18 to about 0.42 in a CIE 1931 chromaticity diagram. In an embodiment, the white light may have color coordinates where Cx is about 0.24 to about 0.50 and Cy is about 0.24 to about 0.42 in a CIE 1931 chromaticity diagram.

For example, when the LED light source is a blue LED light source, the films 10, 20, and 30 for a backlight unit include a green semiconductor nanocrystal and a red semiconductor nanocrystal to provide a ratio of optical density ("OD") (absorbance of first absorption maximum wavelength at UV-Vis absorption spectrum) of about 2:1 to about 7:1, and in an embodiment, about 3:1 to about 6:1.

The light emitting peak wavelength of the blue LED light source may be in a range of about 430 nm to about 460 nm; the green semiconductor nanocrystal may have a light emitting peak wavelength ranging from about 520 nm to about 550 nm; and the red semiconductor nanocrystal may have a light emitting peak wavelength ranging from about 590 nm to about 640 nm.

The films 10, 20, and 30 for a backlight unit may include a plurality of layers including a first layer including a red semiconductor nanocrystal; and a second layer including a green semiconductor nanocrystal. In this case, the plurality of layers may be disposed so that the light emitting wavelength of energy is decreased going toward the LED light source 110. For example, if the LED light source 110 is a blue LED light source, the films 10, 20, and 30 for a backlight unit may include a layer including a red semiconductor nanocrystal and a layer including a green semiconductor nanocrystal that are sequentially stacked in a direction away from the LED light source 110.

Even though not shown in FIG. 4, on the films 10, 20, and 30 for a backlight unit, at least one film selected from a diffusion plate, a prism sheet, a microlens sheet, and a brightness enhancement film (e.g., double brightness enhancement film ("DBEF")) may be further disposed.

In addition, the films 10, 20, and 30 for a backlight unit may be disposed between at least two films selected from a light guide panel, a diffusion plate, a prism sheet, a microlens sheet, and a brightness enhancement film (e.g., double brightness enhancement film ("DBEF")).

FIG. 5 is a schematic view of a liquid crystal display device 200 according to another embodiment. The liquid crystal display device 200 includes films 10, 20, and 30 for a backlight unit between a light guide 120 and a diffusion plate 140. The diffusion plate 140 improves uniformity of light provided from the LED light source 110.

The films 10, 20, and 30 for a backlight unit and the forgoing films may be disposed in contact with or apart from each other.

The films 10, 20, and 30 for a backlight unit may include a plurality of layers. In this case, the plurality of layers may be disposed so that the light emitting wavelength of energy is decreased toward the LED light source 110. For example, when the LED light source 110 is a blue LED light source, the film for a backlight unit 10 and 20 may include a first layer including a red semiconductor nanocrystal and a second layer including a green semiconductor nanocrystal that are sequentially stacked in a direction away from the LED light source 110.

The white light emitted from the backlight unit 201 is incident toward the liquid crystal panel 500. The liquid crystal panel 500 realizes a predetermined color image using the white light incident from the backlight unit 201. The liquid crystal panel 500 may have a structure in which a first polarizer 501, a liquid crystal layer 502, a second polarizer 503, and a color filter 504 are sequentially disposed (the structure of the liquid crystal panel 500 is also indicated in FIGS. 4 and 6). The white light emitted from the backlight unit 201 is transmitted through the first polarizer 501, the liquid crystal layer 502, and the second polarizer 503 and then into the color filter 504 to express a predetermined color image.

FIG. 6 is a schematic view of a liquid crystal display device 300 according to another embodiment. Referring to FIG. 6, a backlight unit 301 includes a LED light source 310, and the films 10, 20, and 30 for a backlight unit spaced apart from the LED light source 310. According to the present embodiment, the LED light source 310 is disposed under the films 10, 20, and 30 for a backlight unit. The LED light source 310 may be an LED light source emitting blue light or an LED light source emitting ultraviolet ("UV") light.

A light passage may be disposed between the LED light source 310 and the films 10, 20, and 30 for a backlight unit, and for example, a light guide panel 320 may be disposed under the films 10, 20, and 30 for a backlight unit. The light guide panel 320 is used to guide light emitted from the LED light source 310 disposed at one side thereof toward the films 10, 20, and 30 for a backlight unit. A reflector (not shown) may be further disposed on the lower surface of the light guide panel 320.

Thereby, the light emitted from the LED light source 310 is provided into the films 10, 20, and 30 for a backlight unit through the light guide panel 320, and the incident light is transmitted into the films 10, 20, and 30 for a backlight unit to be converted into white light.

On the other hand, the films 10, 20, and 30 for a backlight unit may include a plurality of layers. In this case, the plurality of layers may be disposed so that a light emitting wavelength of energy is decreased toward the LED light source 310. For example, when the LED light source 310 is a blue LED light source, the films 10, 20, and 30 for a backlight unit may include a first layer including a red semiconductor nanocrystal and a second layer including a green semiconductor nanocrystal that are sequentially stacked in a direction away from the LED light source 310.

At least one film selected from a diffusion plate, a prism sheet, a microlens sheet, and a brightness improvement film (e.g., double brightness enhancement film ("DBEF")) may be disposed between the films 10, 20, and 30 for a backlight unit and the liquid crystal panel 500.

The films 10, 20, and 30 for a backlight unit may be disposed between at least two films selected from a light guide, a diffusion plate, a prism sheet, a microlens sheet, and a brightness improvement film (e.g., double brightness enhancement film ("DBEF")).

The films 10, 20, and 30 for a backlight unit and the forgoing films may be disposed in contact with or apart from each other.

As described above, the films 10, 20, and 30 for a backlight unit improve color reproducibility and color purity due to a semiconductor nanocrystal. Since the films 10, 20, and 30 for a backlight unit are disposed apart from the LED light sources 110 and 310 in a form of a sheet, the films 10, 20, and 30 for a backlight unit may not be damaged or degraded by heat generated from the LED light sources 110 and 310.

In addition, since the films 10, 20, and 30 for a backlight unit including a matrix resin and the semiconductor nanocrystal may be fabricated as a separate film, the fabrication process of the backlight unit may be simplified.

The films 10, 20, and 30 for a backlight unit may be fabricated by coating a photo-curable composition on at least one film of a backlight unit selected from a light guide, a diffusion plate, a prism sheet, a microlens sheet, and a brightness improvement film followed by photo-curing, which contributes fabrication of a light-weight and slim display element.

Hereinafter, the embodiments are illustrated in more detail with reference to examples. However, the following are exemplary embodiments and are not limiting.

Example 1

Semiconductor Nanocrystal-Polymer Composite Film

Green semiconductor nanocrystals with a light emitting wavelength of 531 nm is dispersed into 421.8 mL of toluene to have 0.069 of optical density ("OD") (absorbance of the first absorption maximum wavelength in UV-Vis absorption spectrum of a 100 times-diluted solution), preparing a green semiconductor nanocrystal dispersion solution.

Red semiconductor nanocrystals having 619 nm of a light emitting wavelength is dispersed into 111.4 mL of toluene to have 0.028 of optical density ("OD") (absorbance of the first absorption maximum wavelength in UV-Vis absorption spectrum of a 100 times-diluted solution), preparing a red semiconductor nanocrystal dispersion solution.

The green semiconductor nanocrystal dispersion and red semiconductor nanocrystal dispersion are mixed with 100 mL of ethanol followed by centrifugation. The supernatant of the solution excluding the centrifuged precipitant is discarded, and the precipitant is dispersed in 4 g of isobornyl acrylate (Sartomer) 4 g as a mono-functional photo-curable monomer. Separately, 3.2 g of (tricyclodecane dimethanol diacrylate (A-DCP, Shin-nakamura) as a multifunctional photo-curable cross-linking agent and 0.8 g of trimethylol propane triacrylate (Aldrich) are mixed and then the resulting mixture is mixed with the prepared dispersion. 2 g of difunctional urethane acrylate oligomer (EB270, Daicel) as a multifunctional photo-curable oligomer is added and agitated. 0.2 g of 1-hydroxy-cyclohexyl-phenyl-ketone and 0.1 g of diphenyl(2,4,6-trimethylbenzoyl)-phosphine oxide as a photoinitiator is added to prepare a photo-curable composition. The multifunctional photo-curable oligomer, and the sum of the mono-functional photo-curable monomer multifunctional photo-curable cross-linking agent are used in a weight ratio of 2:8. The photo-curable composition is coated on a PET (polyethylene terephthalate) substrate film and 1,000 mJ/cm$^2$ of UV is radiated to fabricate a semiconductor nanocrystal-polymer composite film shown in FIG. 3.

Example 2

Semiconductor Nanocrystal-Polymer Composite Film

A semiconductor nanocrystal-polymer composite film is fabricated according to the same method as in Example 1, except that 2 g of difunctional epoxy acrylate (Miramer HR 2200, Miwon Commercial Co., Ltd) is used instead of the difunctional urethane acrylate oligomer.

Example 3

Semiconductor Nanocrystal-Polymer Composite Film

A semiconductor nanocrystal-polymer composite film is fabricated according to the same method as in Example 1, except that 1 g of difunctional urethane acrylate oligomer (KY-100, Shin-nakamura) is used instead of the difunctional urethane acrylate oligomer.

Example 4

Semiconductor Nanocrystal-Polymer Composite Film

A semiconductor nanocrystal-polymer composite film is fabricated according to the same method as in Example 1, except that 1 g of difunctional urethane acrylate oligomer (UX-3204, Nippon kayaku) is used instead of the difunctional urethane acrylate oligomer.

Example 5

Semiconductor Nanocrystal-Polymer Composite Film

A semiconductor nanocrystal-polymer composite film is fabricated according to the same method as in Example 1, except that 1.6 g of 1,10-decanediol diacrylate (A-DOD, Shin-nakamura) as a multifunctional photo-curable cross-linking agent is used instead of tricyclodecane dimethanol diacrylate and trimethylol propanetriacrylate.

Example 6

Semiconductor Nanocrystal-Polymer Composite Film

A semiconductor nanocrystal-polymer composite film is fabricated according to the same method as in Example 1, except that 1.6 g of 1,6-hexanediol diacrylate (Aldrich) as a multifunctional photo-curable cross-linking agent is used instead of tricyclodecane dimethanol diacrylate and trimethylol propanetriacrylate.

Example 7

Semiconductor Nanocrystal-Polymer Composite Film

A semiconductor nanocrystal-polymer composite film is fabricated according to the same method as in Example 1, except that the multifunctional photo-curable oligomer, mono-functional photo-curable monomer and multifunctional photo-curable cross-linking agent are used in each amount of 4 g, 3 g, and 3 g so that the multifunctional photo-curable oligomer and the sum of the mono-functional photo-curable monomer and multifunctional photo-curable cross-linking agent may be a weight ratio of 4:6.

Example 8

Semiconductor Nanocrystal-Polymer Composite Film

A semiconductor nanocrystal-polymer composite film is fabricated according to the same method as in Example 1, except that the photo-curable composition according to Example 1 is coated on a PET (polyethylene terephthalate) substrate film to provide a photo-curable composition coating. The photo-curable composition coating is treated with a mold having a protruded and recessed pattern (w: 440 mm, h: 45 mm, gap: 60 mm). After removing a mold, the photo-curable composition coating is photo-cured with UV of 1,000 mJ/cm$^2$ to provide a patterned semiconductor nanocrystal-polymer composite film. The photo-curable composition is coated on the patterned semiconductor nanocrystal-polymer composite film and is photo-cured with UV of 1,000 mJ/cm$^2$ to provide a two-layered semiconductor nanocrystal-polymer composite film.

Comparative Example 1

Semiconductor Nanocrystal-Polymer Composite Film

A semiconductor nanocrystal-polymer composite film is fabricated according to the same method as in Example 1, except that the multifunctional photo-curable oligomer, mono-functional photo-curable monomer and multifunctional photo-curable cross-linking agent are used in each amount of 6 g, 2 g, and 2 g so that the multifunctional photo-curable oligomer and the sum of the mono-functional photo-curable monomer and multifunctional photo-curable cross-linking agent may be a weight ratio of 6:4.

Comparative Example 2

Semiconductor Nanocrystal-Polymer Composite Film

A semiconductor nanocrystal-polymer composite film is fabricated according to the same method as in Example 1, except that the multifunctional photo-curable oligomer, mono-functional photo-curable monomer and multifunctional photo-curable cross-linking agent are used in each amount of 8 g, 1 g, and 1 g so that the multifunctional photo-curable oligomer and the sum of the mono-functional photo-curable monomer and multifunctional photo-curable cross-linking agent may be in a weight ratio of 8:2.

Comparative Example 3

Semiconductor Nanocrystal-Polymer Composite Film

A semiconductor nanocrystal-polymer composite film is fabricated according to the same method as in Example 1, except that a multifunctional photo-curable cross-linking agent is not used, and the multifunctional photo-curable oligomer and mono-functional photo-curable monomer are each used in an amount of 8 g and 2 g.

Comparative Example 4

Semiconductor Nanocrystal-Polymer Composite Film

A semiconductor nanocrystal-polymer composite film is fabricated according to the same method as in Example 1, except that multi-functional urethane acrylate having a high acid value (UXE-3000, Nippon kayaku, acid value: 100 mg of KOH/g) as a multifunctional photo-curable cross-linking agent is used.

Examples 9 to Example 15 and Comparative Examples 5 to 8

Fabrication of Backlight Unit

Blue LED having a light emitting wavelength of 450 nm is used as a light source, and a light guide and the semiconductor nanocrystal-polymer composite films according to Examples 1 to 8 and Comparative Examples 1 to 4 are positioned respectively. Then, a prism sheet (Shinwha interteck Co., Ltd.) and DBEF (Shinwha interteck Co., Ltd.) are sequentially positioned to fabricate backlight units according to Examples 9 to 15 and Comparative Examples 5 to 8.

Figure 7:
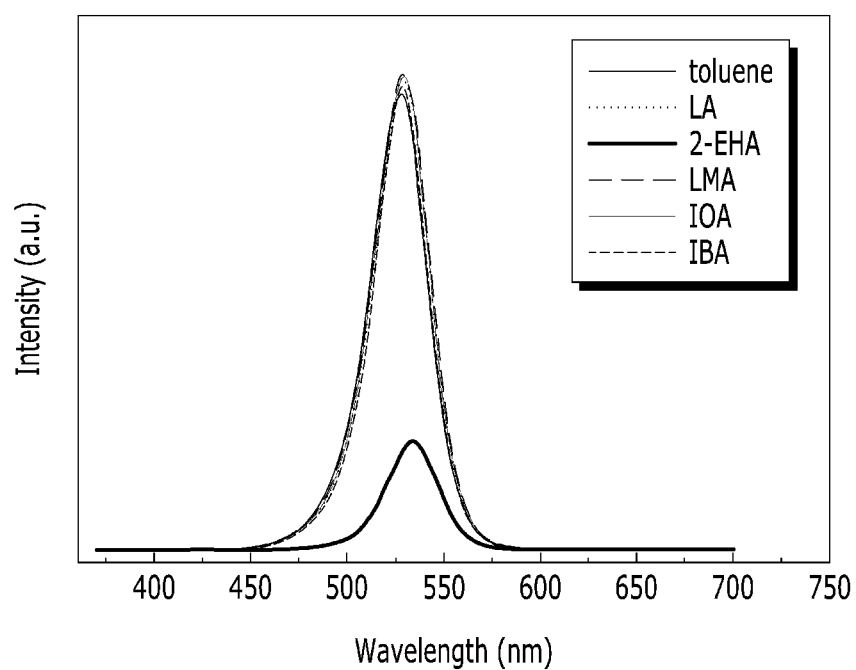
FIG. 7 is a graph of intensity (arbitrary unit, a. u.) versus wavelength (nanometer, nm) showing light emitting characteristics of semiconductor nanocrystals varying in a kind of a mono-functional photo-curable monomer.

Light Emitting Characteristics of Semiconductor Nanocrystal Depending on Kind of Mono-Functional Photo-Curable Monomer Affinity for semiconductor nanocrystals of Lauryl acrylate ("LA"), lauryl methacrylate ("LMA"), isooctyl acrylate ("IOA"), isobornyl acrylate ("IBA"), and 2-hydroxyethylacrylate ("2-EHA") as a mono-functional photo-curable monomer is evaluated as follows. The green semiconductor nanocrystal dispersion including a green semiconductor nanocrystal having light emitting wavelength of 531 nm according to Example 1 is solvent-exchanged with 3 g of the mono-functional photo-curable monomer. The results are shown in FIG. 7. In FIG. 7, the "toluene" indicates that the green semiconductor nanocrystal dispersion including a green semiconductor nanocrystal having light emitting wavelength of 531 nm according to Example 1 does not mix with the mono-functional photo-curable monomer. As shown in FIG. 7, the dispersions that mix with lauryl acrylate ("LA"), lauryl methacrylate ("LMA"), isooctyl acrylate ("IOA"), and isobornyl acrylate ("IBA") shows similar light emitting characteristics to the dispersion that does not mix the mono-functional photo-curable monomer. On the contrary, the dispersion that mixes with 2-hydroxyethylacrylate ("2-EHA") shows remarkably reduced light emitting characteristics.

Mechanical Properties and Particle Size of Semiconductor Nanocrystal-Polymer Composite Film Mechanical properties of the semiconductor nanocrystal-polymer composite films according to Examples 1 to 7 and Comparative Examples 1 to 4 are evaluated. Tensile strength is evaluated by measuring stress using equipment of Materials Testing Machine LRX plus (LLOYD instruments), and tensile elongation is measured using Physica MCR501 (Anton Paar). Storage modulus is measured using Materials Testing Machine LRX plus (LLOYD instruments). In the following Table 1, the particle size refers to an average particle size of a cluster including primary particles of a red semiconductor nanocrystal 13 and a green semiconductor nanocrystal 15. The particle size is measured using a particle size analyzer (ELS-Z2, Photal Otsuka electronics).

TABLE 1

| | Yield Point | | Break Point | | Storage | Particle |
| --- | --- | --- | --- | --- | --- | --- |
| | Stress (MPa) | Elongation (%) | Stress (MPa) | Elongation (%) | Modulus (MPa) | Size (μm) |
| Example 1 | 25.8 | 13.5 | 25.3 | 35.7 | 75 | 0.471 |
| Example 2 | 31.8 | 11.7 | 28.6 | 26.1 | 63 | 0.532 |
| Example 3 | 23.4 | 16.7 | 17.4 | 37.6 | 59 | 0.372 |
| Example 4 | 43.6 | 12.8 | 48.0 | 14.7 | 67 | 0.518 |
| Example 5 | 22.6 | 16.7 | 23.4 | 29.1 | 48 | 0.389 |
| Example 6 | 27.8 | 15.1 | 24.9 | 30.4 | 54 | 0.416 |
| Example 7 | 18 | 18 | 20.9 | 59 | 62 | 0.504 |
| Comparative Example 1 | 6.2 | 20.7 | 13.3 | 101 | 23 | 1.204 |
| Comparative Example 2 | — | — | 6 | >120 | 15 | 1.825 |
| Comparative Example 3 | 5.7 | 18.6 | 15.1 | 97 | 17 | 1.759 |
| Comparative Example 4 | 8.3 | 17.9 | 13.7 | 65 | 32 | 4.753 |

Referring to Table 1, the semiconductor nanocrystal-polymer composite films according to Examples 1 to 7 show high tensile strength and low tensile elongation, and have small particle sizes of clusters. On the contrary, Comparative Examples 1, 3 and 4 show low tensile strength and high tensile elongation, and the characteristics in Comparative Example 2 are impossible to measure.

Luminance of Backlight Unit

Luminance of the backlight units according to Examples 9 to 15 and Comparative Examples 5 to 8 is measured using a spectroradiometer (CS-2000, Minolta). The results are shown in Table 2.

TABLE 2

| | Luminance (nit) |
| --- | --- |
| Example 9 | 526 |
| Example 10 | 521 |
| Example 11 | 515 |
| Example 12 | 498 |
| Example 13 | 520 |
| Example 14 | 487 |
| Example 15 | 457 |
| Comparative Example 5 | 185 |
| Comparative Example 6 | 214 |
| Comparative Example 7 | 200 |
| Comparative Example 8 | 244 |

From the Table 2, backlight units ("BLU") according to Examples 9 to Example 15 show high luminance compared with those according to Comparative Examples 5 to 8.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present disclosure in any way.

What is claimed is:

1. A backlight unit comprising a film for the backlight unit comprising
    a semiconductor nanocrystal-polymer composite film comprising a semiconductor nanocrystal and a matrix polymer in which the semiconductor nanocrystal is dispersed,
    wherein the matrix polymer comprises a polymerization product of a multifunctional photo-curable oligomer, a mono-functional photo-curable monomer, and a multifunctional photo-curable cross-linking agent,
    the multifunctional photo-curable oligomer has an acid value of less than or equal to about 0.1 milligram of KOH/gram, and
    a content by weight ($A_1$) of a first structural unit derived from the multifunctional photo-curable oligomer, a content by weight ($A_2$) of a second structural unit derived from the mono-functional photo-curable monomer, and a content by weight ($A_3$) of a third structural unit derived from the multifunctional photo-curable cross-linking agent satisfy Equation 1:

$$A_1 < (A_2 + A_3). \qquad \text{Equation 1}$$

2. The backlight unit of claim 1, wherein the backlight unit comprises
    an LED light source;
    the film for a backlight unit disposed separate from the LED light source to convert light emitted from the LED light source to white light and to provide the converted white light toward liquid crystal panel; and
    a light guide panel disposed between the LED light source and the film for a backlight unit.

3. The backlight unit of claim 1, wherein the backlight unit further comprises at least one film selected from a diffusion plate, a prism sheet, a microlens sheet, and a brightness improvement film on the film for a backlight unit.

4. The backlight unit of claim 1, wherein the film for a backlight unit is positioned between at least two films selected from a light guide, a diffusion plate, a prism sheet, a microlens sheet, and a brightness improvement film.

5. The backlight unit of claim 1, wherein the white light provided from the film for a backlight unit has Cx ranging from about 0.20 to about 0.50 and Cy ranging from about 0.18 to about 0.42 in a CIE 1931 chromaticity diagram.

6. The backlight unit of claim 1, wherein when the LED light source is a blue LED light source, the green semiconductor nanocrystal and the red semiconductor nanocrystal is included to provide a ratio of optical density of about 2:1 to about 7:1.

7. The backlight unit of claim 1, wherein the film for a backlight unit comprises a plurality of layers which are disposed to provide a light emitting wavelength of lower energy going toward the LED light source.

8. A liquid crystal display device comprising the backlight unit according to claim 1.

\* \* \* \* \*